United States Patent [19]
Adler

[11] 4,107,850
[45] Aug. 22, 1978

[54] STONE AND MOUNTING GAUGE

[76] Inventor: Raphael Adler, 73-44 Vleigh Pl., Kew Garden Hills, Queens, N.Y. 11367

[21] Appl. No.: 778,889

[22] Filed: Mar. 18, 1977

[51] Int. Cl.$^2$ ............................ G01B 3/46; G01B 5/08
[52] U.S. Cl. .................................. 33/178 B; 30/358; 81/7
[58] Field of Search ..................... 33/168 R, 178 B; 30/358; 81/7

[56] References Cited

U.S. PATENT DOCUMENTS

| | | | |
|---|---|---|---|
| 66,798 | 7/1867 | Collins | 33/178 B |
| 628,310 | 7/1899 | Goldner | 33/178 B |
| 950,221 | 2/1910 | Bernhardt | 33/178 B |
| 994,229 | 6/1911 | Winkler | 81/7 |
| 1,045,299 | 11/1912 | Krimmling | 81/7 |
| 1,114,666 | 10/1914 | Anderson | 30/358 |
| 1,217,313 | 2/1917 | Johansson | 33/178 B |
| 2,861,347 | 11/1958 | Von Tarnik | 33/178 B |
| 2,901,829 | 9/1959 | Lucas | 33/168 R |
| 3,993,045 | 11/1976 | Ion | 33/178 B |

FOREIGN PATENT DOCUMENTS 218,671  1/1925  United Kingdom .................. 33/168 R

*Primary Examiner*—Richard R. Stearns
*Attorney, Agent, or Firm*—Samson Helfgott

[57] ABSTRACT

A mounting gauge for measuring the size of a stone mounting including a support assembly having a plurality of individual arms extending from the support assembly. A disk like foot is mounted at the end of each of the arms and is substantially perpendicular to the longitudinal axis of each arm. The feet are successively larger in diameter. The support assembly can be a circular member, a rectangular member, or can be of other shapes. Also, it can include a linear array of body portions pivotally positioned on a post and including a positioning assembly whereby the body portions can be rotated about a post and can be locked in either of two diametrically opposed positions. The individual arms can be made retractable permitting the selection of a single arm for measurement. Gauging bores can also be included for measuring the size of the stone with the diameter of the bores being successively larger and corresponding to the diameter of the disk like feet.

15 Claims, 13 Drawing Figures

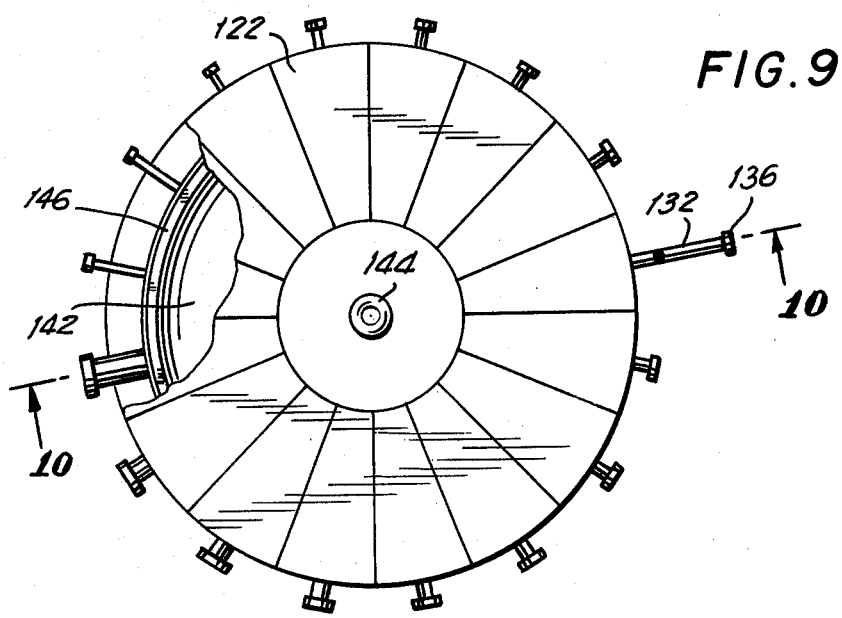
FIG. 9
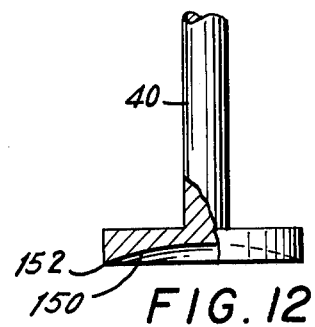
FIG. 12
FIG. 10
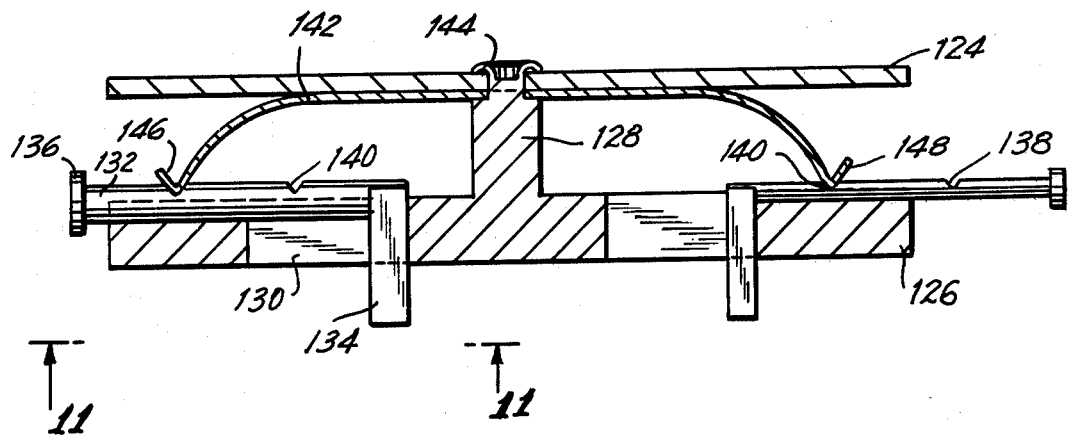
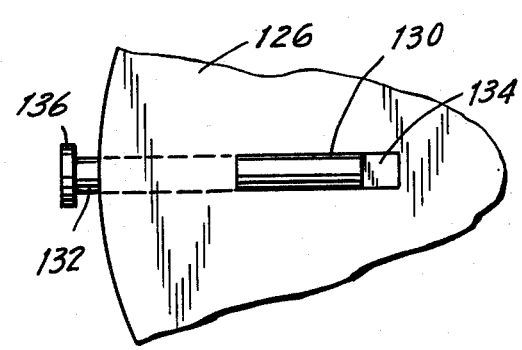
FIG. 11
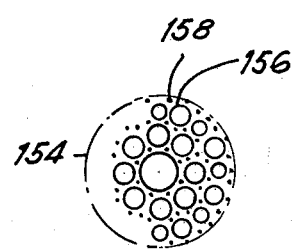
FIG. 13

STONE AND MOUNTING GAUGE

BACKGROUND OF THE INVENTION

This invention relates to gauges and more particularly to a stone and mounting gauge for use in the jewelry industry and for the manufacture of jewelry.

An extremely important and useful instrument in the jewelry industry is a gauge which can be used to measure the size of a setting and determine the stone size required in such setting as well as the measurement of the stone itself. In selecting a stone to fit a particular setting contained in a jewelry mounting, it is necessary to measure the size of the setting and determine the appropriate size stone that will properly fit within the mounting. An improper measurement can cause the wrong selection of stone resulting in difficulties to properly mount the stone in the particular piece of jewelry. In many situations the setting is situated in an elaborate mounting which makes it awkward to reach the setting and utilize standard calipers, micrometers, or other standard measuring tools.

To specifically accommodate the jewelry industry and facilitate the measuring of setting, there has been developed in the prior art a unique type of stone and mounting gauge specifically designed for the jewelry industry. Such gauges generally include a flat sheet of metal or plastic which is stamped to include individual heads extending from a circular main portion by protruding necks. The heads are flat and lie in the same plane as the center portion, the entire instrument being of a single flat sheet. In use, the heads are placed over the mounting and utilizing the naked eye, or with the aid of a jewelers eyepiece, an estimate is made of the setting size by comparison to one of these heads.

Because the heads are flat and are interconnected by neck portions to a central member, they cannot be passed into the mounting itself. As a result, only estimates can be made of the setting size. Furthermore, when the setting is recessed within an elaborate mounting and the gauging tool must be spaced from the mounting itself, parallax errors may occur in the measurement. Such errors, although they only may be slight in actual size measurement, can be very costly when dealing in precious jewels. The selection of a jewel size even slightly larger than one actually needed can add unnecessary cost to a particular piece of jewelry.

Additionally, jewelry mountings often consist of multiple settings of many different sizes. To determine the proper stones to fit into the individual settings would require an assortment of different sized stones. These stones would need to be available during the finishing of the mounting for proper selection of stone size. However, because of the large supply required it is quite possible to lose some of the stones.

SUMMARY OF THE INVENTION

Accordingly, it is an object of the present invention to provide a mounting gauge for measuring the size of a stone mounting which avoids the aforementioned problems of prior art devices.

Yet a further object of the present invention is to provide a mounting gauge for measuring the size of a stone mounting which includes a plurality of disks which can be inserted directly into a setting or placed above the mounting for comparison.

A further object of the present invention is to provide a mounting gauge for measuring the size of a stone mounting including a plurality of individual arms having disk like feet mounted at the end of the arm wherein the feet are successively larger in diameter. Yet another object of the present invention is to provide a mounting gauge for measuring the size of a stone mounting which permits the measuring of settings which are recessed, remotely located or awkwardly positioned.

Still a further object of the present invention is to provide a mounting gauge for determining the size of a stone mounting and including a plurality of extending arms with successively larger feet at the end of the arms and wherein each arm can be uniquely selected for measurement use.

A further object of the present invention is to provide a mounting gauge for measuring the size of a stone mounting which includes retractable arms for selecting an appropriate one of a plurality of arms for use in measuring the mounting size.

Yet another object of the present invention is to provide a mounting gauge for measuring the size of a stone mounting which includes bores for also measuring the size of stones.

Yet a further object of the present invention is to provide a mounting gauge which can be used for comparison or passing through a mounting and which provides an accurate measurement in either millimeters or in points.

A further object of the present invention is to provide a stone and mounting gauge for measuring the size of precious stones and stone mountings and which is easy to utilize, simple in construction, rugged, and easy to transport.

These and other objects, features and advantages of the invention will, in part, be pointed out with particularity, and will, in part, become obvious from the following more detailed description of the invention taken in conjunction with the accompanying drawings which form an integral part thereof.

Briefly, there is described a mounting gauge for measuring the size of a stone mounting which includes a support assembly. A plurality of individual arms extend from the support assembly. A disk-like foot is mounted on the outer end of each of the arms and is positioned in a plane perpendicular to the longitudinal axis of each arm. The feet are successively larger in diameter.

In an embodiment of the invention, the support assembly is circular in shape and has an upper and lower surface. The arms are angularly spaced about the periphery of the circular member and extend radially outward therefrom. The circular member is divided into a plurality of sectors with each arm respectively extending from one of the sectors. Indicia identifying the size of the foot at the end of the arm can be placed in each sector.

In another embodiment of the invention, the support assembly comprises a post means and a linear array of body portions are placed in pivotal relationship with the post means. Each body portion supports a respective one of the arms. Retention means retain the body portions on the post means such that the arms are in an aligned position. At the same time, the retention means permit selection of at least one body portion for placing its corresponding arm in a non-aligned position. More specifically, end stops are placed at opposite ends of the post means with a biasing means holding the linear array in position. A detent assembly is utilized to permit each body portion to be rotated about the post means and locked in either of two diametrically opposed positions.

In yet another embodiment there is included selection means for selectively moving one of the arms between a retracted position and an operational extended position. Such selection means can include a spring plate having a resilient edge which can engage inner and outer notches in the arm. A depending portion from each arm is slidably received in a slot in the support assembly.

In each of the embodiments, bores can be placed in the support assembly for also providing a measurement of the stone sizes. The bores would each be associated with one of the respective arms and would have successively increasing diameters corresponding to the diameters of the disk like feet. The indicia can be provided both in points and in milimeters for convenience of measuring.

BRIEF DESCRIPTION OF THE DRAWINGS

In the drawings:

FIG. 9 is a top view, partially broken away, of a further embodiment of the present invention utilizing retractable arms;

FIG. 10 is a side sectional view taken along line 10—10 of FIG. 9;

FIG. 11 is a bottom view taken along line 11—11 of FIG. 10;

FIG. 12 shows a fragmentary partially sectional side view of a modified arm and foot arrangement, and FIG. 13 shows a use for the arrangement of FIG. 12.

In the various figures of the drawing, like reference characters designate like parts.

DESCRIPTION OF THE PREFERRED EMBODIMENTS

Figure 1:
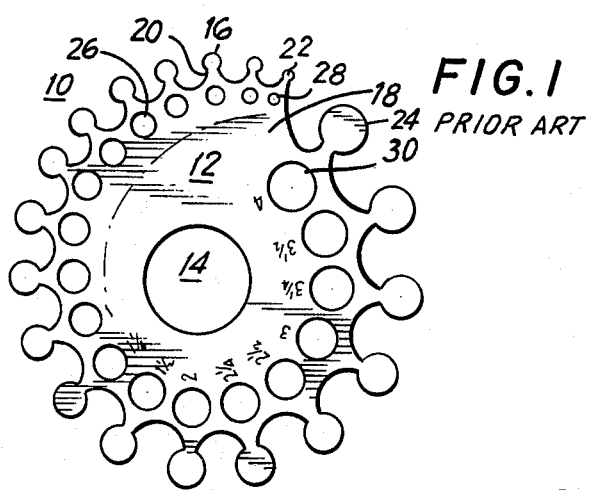
FIG. 1 is a planar view of a prior art stone and mounting gauge.

Stone and mounting guages for use in the jewelry industry have been available for providing an estimate of the mounting size and a gauge of a stone size. A typical prior art gauge useful for such purposes is shown in FIG. 1. The gauge shown generally at 10 includes a unitary plate 12 of substantially circular shape with a center bore 14. Extending from the outer edge of the plate 12 there are individual head portions 16 interconnected to the central portion 18 by means of the neck portions 20. The head portions 16 are successively larger in size commencing from the smallest head portion 22 and continuing in a counter-clockwise direction until the largest head size 24 is reached.

On the main body 18 there are formed bores 26 placed adjacent to the neck of a corresponding head. The bore size is substantially identical to the head size adjacent thereto. The bores also are successively larger in diameter starting from the smallest bore 28 and continuing to the larges bore 30.

Indicia are placed on the main body 18 for identifying the diameter of the bore and the corresponding diameter of the head adjacent thereto.

In utilizing the prior art gauge for measuring a mounting, the heads are placed over the mounting and by means of the naked eye, or utilizing a jewelers eyepiece, the head size which approximates the mounting is estimated. Where the mounting is easily accessible and positioned at or adjacent to the surface of a jewelry setting, the prior art gauge is relatively satisfactory since the various heads can be placed directly over the mounting and a fairly good estimate of the mounting size can be obtained. However, where the mounting is recessed and inaccessible to a planar surface, the heads must be held a spaced distance from the mounting and the appropriate head size must be estimated from this spaced apart distance. Such estimations are subject to parallax errors as well as judgement errors on the part of the estimator. The problem is even further compounded should the mounting be positioned at an angular relationship with the surface of the jewelry setting. In such cases, since the prior art gauge is flat it would be placed at an angular relationship with the mounting opening making accurate comparisons most awkward and difficult to estimate.

Figure 2:
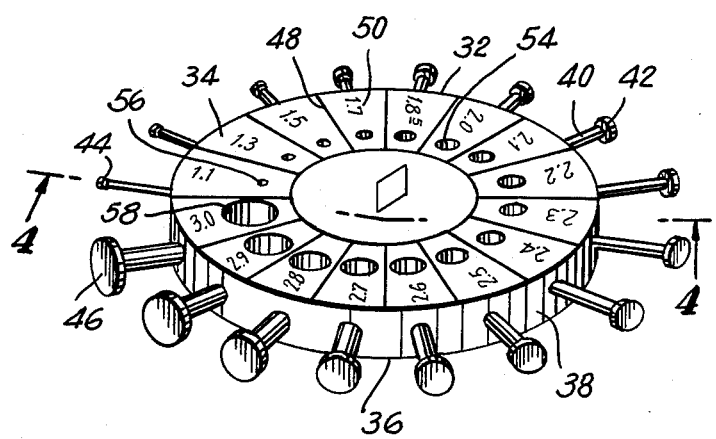
FIG. 2 is an isometric view of one embodiment of the present invention.
Figure 3:
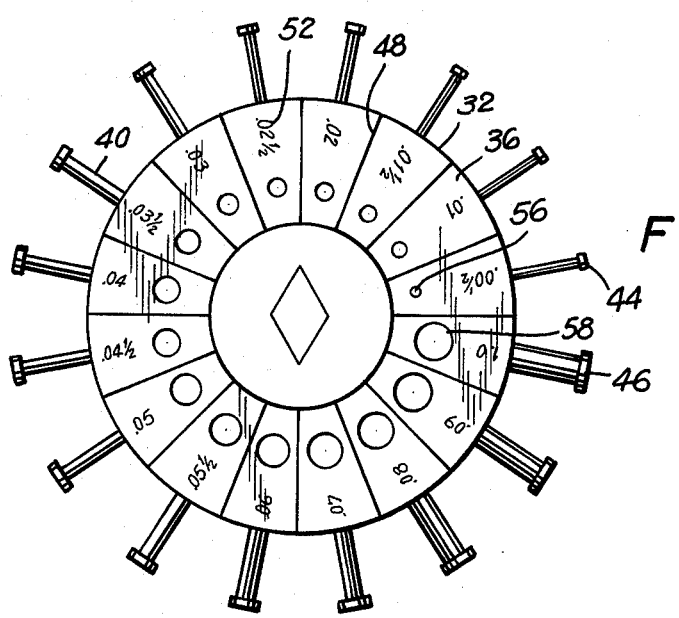
FIG. 3 is a top plan view of the embodiment shown in FIG. 2.
Figure 4:
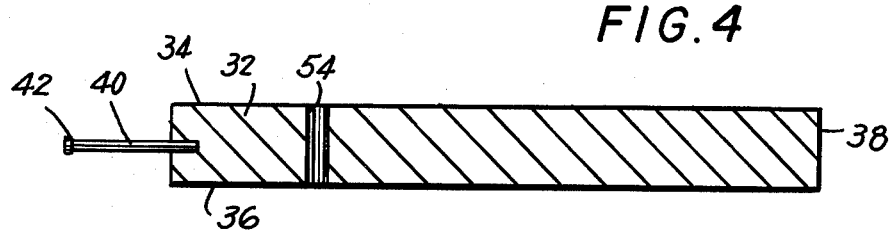
FIG. 4 is a sectional view taken along line 4—4 of FIG. 2.

Referring now to FIGS. 2-4 there is shown a first embodiment of the present invention which can be utilized in a superior manner to the prior art gauge. The gauge includes a support assembly having a circular disk like member 32 with a top surface 34 and a lower surface 36. A peripheral side wall 38 interconnects the upper and lower surfaces. Arms 40 radially extend from the periphery 38 and are angluarly spaced apart about the periphery. The arms are shown as cylindrical members, however, bent pins could also be utilized. At the outer edge of the arms, and in a plane perpendicular to the longitudinal axis of the arm, is a disk like foot 42. The feet are successively larger in diameter starting with the smallest foot 44 and continuing in a clockwise direction to the largest diameter foot 46.

The diameter of the arms are made smaller in size than the diameter of the foot extending from that arm in order to readily determine whether the foot has entered a mounting or is compared in size with a mounting hole. Although the diameters of the arms are shown as being successively larger in size, they can all be uniform in size, so long as the size is smaller than the smallest diameter foot.

The circular disk-like member 32 is divided up into sectors by means of the sector lines 48 such that each arm is respectively positioned within a sector. Each sector includes indicia 50 on one surface identifying the size of the foot extending from that sector wherein the designation is in milimeter measurements. The sectors are correspondingly formed both on the upper and lower surface and, on the lower surface as shown in FIG. 3, the designation of the size is given in weight in points per carat 52.

The gauge also includes gauging bores 54 for measuring the size of stones. The bores are respectively positioned in the sectors and are angularly spaced apart from each other along a common diameter. The bores are successively larger in diameter commencing with the smallest bore size 56 and terminating in the largest bore size 58. The diameter of each bore corresponds to the diameter of the foot associated with that sector. Accordingly, the size indicated both in milimeters and in points will be identical for both the foot size utilized in measuring the mounting as well as the bore size used in measuring the stone.

In utilizing the device shown in FIGS. 2-4, the disk like feet radially protruding from the circular member will be compared with the mounting size. The individual feet can be placed above the mounting where it can be compared by means of an estimation, as with prior art devices. However, to be sure of an accurate measurement the disk like feet can be directly placed into the mouth of the mounting thereby insuring that the proper size has been selected. Furthermore, because of the arms extending from the circular member, the measurement can be made even in recessed mountings or awkwardly positioned mountings.

Because of the circular shape of the device and the correspondingly angular spacing between adjacent arms, each foot lies in a plane which extends outwardly from the circular member, further than the outermost edges of the next adjacent feet on either side. This is because of the curved relationship of the outer edges of the disks with respect to each other. As a result, each disk can be inserted into a mounting without interference of the adjacent arms on either side thereof.

Figure 8:
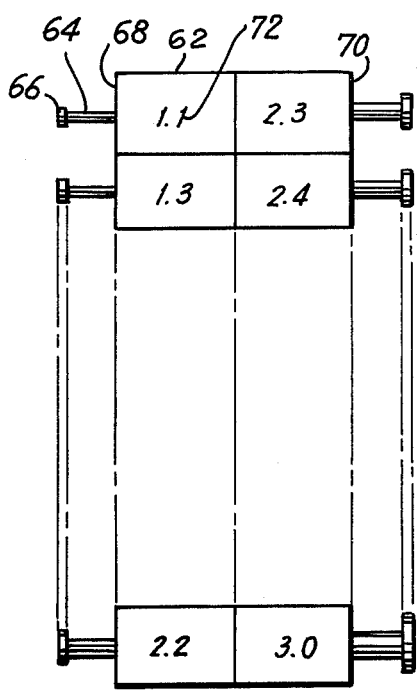
FIG. 8 is an alternate modification of the embodiment shown in FIG. 2.

While a circular member has been shown, it will be apparent that other shapes can also be utilized, as for example the rectangular shape shown in FIG. 8 which includes the rectangular member 62 with the individual arms 64 having disk like feet 66 at the end thereof protruding from the sides 68, 70 of the rectangular member. The rectangular member 70 is divided into individual smaller rectangular units, each containing indicia 72 identifying the size of the disk like feet at the outer end of the arm extending therefrom. The member can be made thin and flat and the arms can either protrude from the two longer sides or could in fact protrude from all four sides. Additionally, if made very narrow, the arms could extend only from one side. Although not shown, gauging bores could also be included for measuring the size of stones. Furthermore, while only the top side is shown, the reverse side could also include indicia identifying the size in points.

Figure 5:
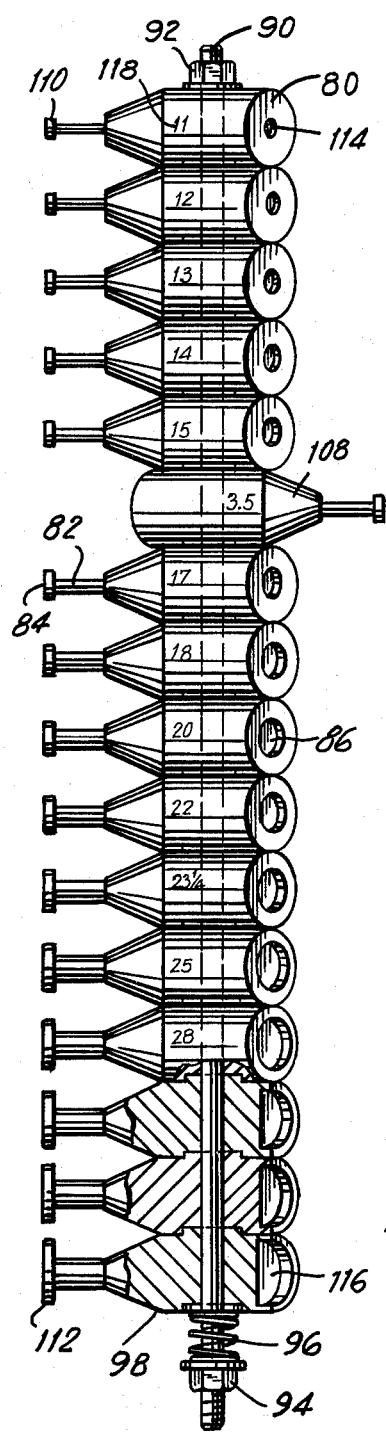
FIG. 5 is a top view, partially in section, of an alternate embodiment of the present invention.
Figure 6:
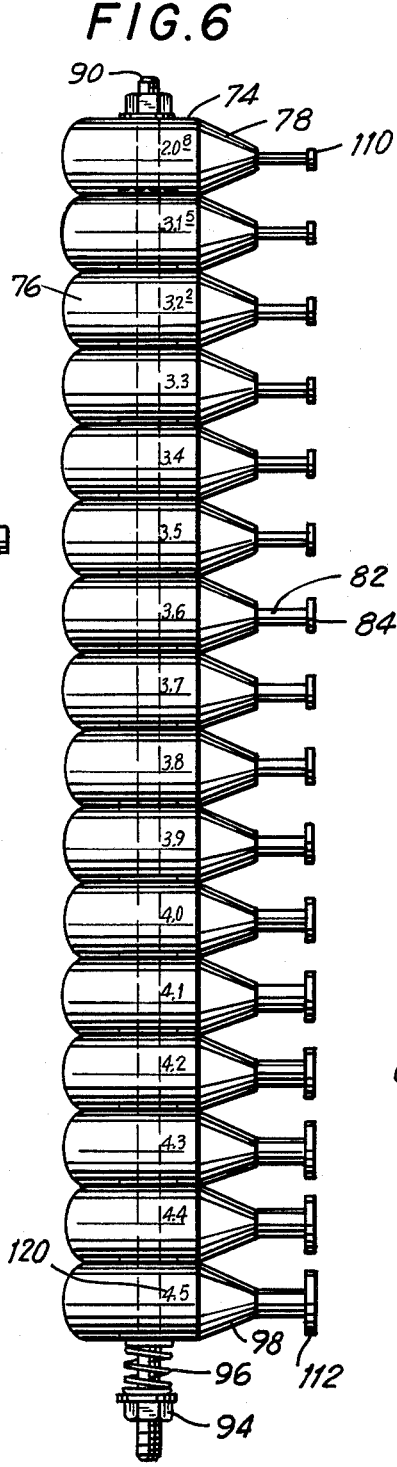
FIG. 6 is a bottom view of the embodiment shown in FIG. 5.
Figure 7:
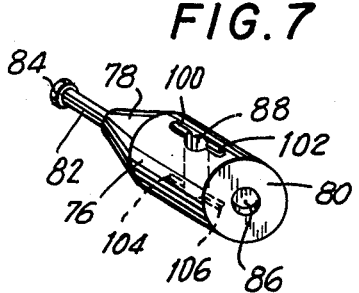
FIG. 7 is an isometric view of one body portion and extending arm as utilized in the embodiment shown in FIG. 5.

Referring now to FIGS. 5-7, there is shown another embodiment of the present invention including a linear array of individual body portions 74 of substantially cylindrical shape having a cylindrical main body portion 76 with a tapered portion at one thereof 79 and an angled surface 80 at the opposite end. Arms 82 outwardly extend from the tapered end and include the disk like feet 84 at the outer edge thereof and in a plane perpendicular to the longitudinal axis of the arm. A counterbore hole 86 is formed in the angled surface for measuring the size of the stones.

The body portions each include a center bore 88 passing through the cylindrical section 76. A post 90 passes through all of the center bores of the body portions and includes end stop 92 at one end, shown as a nut and washer assembly and a second end stop end 94 at the opposite end, shown also as a nut and washer assembly. A biasing spring 96 is positioned between the end step 94 and the first body portion 98 in the linear array. At least one of the end stops 92, 94 should be adjustable to tighten the tension holding the linear array together.

A detent assembly is included in each body portion to maintain the linear array of body portions with the arms extending in aligned positions. At the same time, the detent assembly permits selection of at least one body portion for placing its arm in a non-aligned position. Specifically, protrusions 100, 102 are equally spaced on either side of the bore. On the opposite side of the bore, recesses 104, 106 are similarly spaced on either side of the bore. The body portions are positioned adjacent each other so that the projections on one side of a body portion mate with the recesses of the next adjacent body portion.

With all of the arms extending in the same direction as shown in FIG. 6, the projections of one body portion will be received by the mating recesses on the opposite side of the next adjacent body portion and will be securely held in place to prevent its pivoting about the post. The biasing spring will hold the linear array in place in its aligned position. However, when one of the arms is selected for operational use, the body portion can be rotated about the post. By applying pressure, the force will act against the biasing spring releasing the projections from its adjacent recesses and permit the body portion to rotate about the post. As the rotation continues, the body portion will reach a diametrically opposed position to its original aligned position, and again the projections will be received in the mating recesses of the next adjacent body portion and will again be locked in place in a position diametrically opposed to that of its original position, as shown in FIG. 5, with respect to body portion 108 which extends in an opposite direction from the remainder of the linear array.

The disk like feet 84 are made successively larger in diameter commencing with the smallest foot 110 at one end of the array and ending in the largest foot 112 at the opposite end of the array. Similarly, the counterbores 86 correspond in diameter with the foot on that body portion and start from a smallest diameter shown at one end 114 and extend to the largest diameter at the opposite end 116. While the arms are shown as being successively larger in diameter, it will be understood that they can all be made of identical size, as long as the size is smaller than the smallest diameter foot.

On one side of the body portion, as shown in FIG. 5, indicia 118 identify the size of the foot and the counterbore in terms of its weight in points. On the opposite side, as shown in FIG. 6, the indicia 120 identify the size in milimeters. It should be noted, that by making the counterbores in the angled surface 80, it is possible to insert a stone into the counter bore and at the same time read the indicia on the surface of the body portion.

In operation, when a mounting is to be measured, the individual body portions can be flipped over from their aligned position and locked in place by means of the detent assembly wherein only a single arm with its outer disk-like foot will be protruding from one side of the device. The protruding arm can then be compared with the mounting by estimating the size at its surface or by actually inserting the dish-like foot into the mouth of the mounting obtaining an accurate measurement. Furthermore, because there are no adjacent protruding arms extending from that side of the device, the single protruding arm will not have any interference from adjacent arms and can easily reach recess mountings as well as awkwardly positioned mountings for an accurate measurement.

Referring now to FIGS. 9-11, it will be noted that in a further embodiment of the invention, the individual arms can be made retractable from the main body supporting the arms. The main body 122 includes an upper plate 124 and a lower plate 126 interconnected by means of a centerpost 128. Radial slots 130 are formed in the lower plate 126. The arms 132 contain downwardly depending sections 134 which can extend through the slot 130 and can slide therein whereby the foot 136 at the end of the arm 132 can be moved from an inwardly retracted position, as shown at the left portion in FIG. 10, to the outwardly extending position as shown in the right portion of FIG. 10. Front and rear notches 138, 140, are formed along the arm. An inverted dish-like member 142 is positioned between the upper and lower plates 124, 126 and is held in place onto the upper plate 124 by means of an eyelet 144. At least the outer edges 146 of the plate are made resilient, although the entire plate itself can be of resilient material, such as spring steel. The outer edges include a finger-like extension 148 which can readily engage the notches 138, 140.

In utilizing the device shown in FIG. 9-11, the arms will normally be contained in their inwardly retracted position. When a measurement is to be made, a single arm can be moved by means of the depending portions 134 from its inward retracted position to its outwardly extending position and held in place by means of the finger 148 resting in the notches 140. The extended arm 132 can then be utilized with the corresponding foot 136 for insertion into a mounting or for estimating the size of the mounting at its surface. In this manner only a single arm and its associated foot will be extending from the device and will be available for insertion into the mounting without interference from adjacent arms.

Appropriate indicia could be placed on either or both sides of the device and sectors can be formed. Additionally, appropriate bores can be made for measurement of stone size, as was described with regard to the other embodiments. Additionally, while a circular member was shown, it will be understood that other shapes, as for example the rectangular shape of FIG. 8, could also be made with a resilient plate permitting the extension and retraction of arms.

The particular number of arms extending from the devices, as well as the indicia and the size of the feet could be varied, depending upon the selection of the sizes and the number of sizes desired. The material from which the gauge is made can either be a metal, a plastic, or other sturdy and durable material which will withstand continuous use. However, the feet must be made of accurate size since its diameters will be utilized for appropriate dimensioning and measurement. Therefore, hardened steel is probably most suitable.

Referring now to FIG. 12, there is shown a modified arrangement of the arm 40 wherein the foot portion includes a concave recess 150 formed in the outer surface thereof. The recess terminates at the periphery forming a sharp outer edge 152. With the arrangement shown in FIG. 12, the gauge can actually be utilized as a jeweler's tool and enables the jeweler to utilize the tools during the process of manufacturing. The jeweler can mark the desired stone sizes on a metal surface which will be utilized for the piece of jewelry. By pressing the sharp outer edge of the specific foot size desired and if necessary, rotating the sharp edge into the metal surface, there will be formed an accurate outline of the desired stone size. Where many different stone sizes are to be placed in a particular piece of jewelry, these sizes can be marked in a rapid manner. Once the marks have been made, holes can be properly drilled for prongs to be inserted into them in a precisely accurate manner around the desired holes.

By way of example, FIG. 13 shows a particular part of a metal surface 154 wherein the stone sizes have been marked 156 and wherein the holes 158 have been drilled for insertion of the prongs. It will be recognized, that the size of the foot shown in FIG. 12 is greatly enlarged and magnified for the purpose of viewing. However, to obtain the specified sizes shown in FIG. 13 appropriate sized feet would be utilized.

Alternately, the foot with the recess can be utilized in conjunction with an ink pad to stamp the size of the hole on the surface of the metal. Still other types of marking means can be formed in conjunction with the foot. For example, a center pivot pin can be formed extending from the surface of the foot with one or more peripheral pins extending from the surface to a lesser amount than the center pin. The center pin can then be inserted into the metal surface to retain the foot and the peripheral pins utilized to scratch the hole size in the surface as the foot is rotated.

There has been disclosed heretofore the best embodiment of the invention presently contemplated. However, it is to be understood that various changes and modifications may be made thereto without departing from the spirit of the invention.

I claim:

1. A jeweler's mounting gauge for measuring the internal size of a stone mounting comprising:
   a support assembly including a circular member having upper and lower surfaces and a circumferential wall surface therebetween;
   a series of individual extended arms of uniform length angularly spaced apart about the periphery of the circular member and radially embedded in and extending from said circumferential wall of said support assembly; and
   a disc-like foot permanently mounted on the outer end of each said arms concentrically therewith to lie in a plane perpendicular to the longitudinal axis of each arm and perpendicular to said upper and lower surfaces of said support assembly, the feet being successively larger in diameter.

2. A mounting gauge as in claim 1 and wherein said circular member comprises indicia means for dividing it into a plurality of sectors, each extended arm extending from a respective one of said sectors, and wherein each of said sectors includes indicia identifying the size of the foot at the end of its extended arm.

3. A mounting gauge as in claim 2 and wherein said indicia means comprises corresponding sector divisions on both its upper and lower surfaces, and wherein the sectors on one surface bear indicia identifying the size of the feet in points, and the other surface bears corresponding indicia in milimeters.

4. A mounting gauge as in claim 2 further comprising a plurality of gauging bores for measuring the size of stones, said bores respectively positioned in said sectors, being angularly spaced apart from each other about a common diameter, and being successively larger in diameter, the diameter of each bore corresponding to the diameter of the foot associated with that sector.

5. A mounting gauge as in claim 1 and wherein said arms are all uniformly cylindrical in shape, the diameter of said cylindrical shape being less than the smallest diameter of said feet.

6. A mounting gauge as in claim 1 wherein the outer surface of each disc-like foot includes marking means for providing a mark the size of the foot on a surface.

7. A mounting gauge as in claim 6 wherein said marking means includes a concave recess formed in the outer surface of each disc-like foot forming a sharp peripheral edge on the foot.

8. A mounting gauge for measuring the size of a stone mounting comprising: a support assembly; a series of individual arms extending in sequence from said support assembly, and a disc-like foot mounted on the outer end of each said arm in a plane perpendicular to a longitudinal axis of each arm, the feet being successively larger in diameter, and wherein said support assembly comprises post means, a linear array of body portions each pivotally positioned on said post means, each body portion supporting a respective one of said arms, and retention means for maintaining said body portions on said post means such that said arms are in an aligned position, while permitting selective movement of at least one body portion for placing its arm in a non-aligned position.

9. A mounting gauge as in claim 8 and wherein said retention means comprises end stops positioned on said post means, the longitudinal position of at least one of said end stops being adjustable, biasing means extending between one of said end stops and one end of said linear array of body portions, and locking means for locking each of said body portions in one of two positions with respect to the adjacent body portion.

10. A mounting gauge as in claim 9 and wherein each of said body portions includes a through bore for receiving said post means and wherein said locking means comprises a detent assembly including a pair of projections on one side of each of said body portions equally spaced on either side of the bore, and a pair of mating recesses on the opposite side of the next adjacent body portion and similarly spaced on either side of the bore, whereby each said body portion can be rotated about said post means and locked in diameterically opposed positions.

11. A mounting gauge as in claim 8 and wherein each body portion has one end thereof tapered, the arm extending from said tapered end, an angled surface at the end of said body portion opposite said tapered end, and a counterbore hole formed in said angled surface, said counterbore holes being successively larger in diameter and wherein the diameter of each counterbore hole corresponds to the diameter of the foot associated with that body portion.

12. A mounting gauge as in claim 8 and wherein said body portions each include indicia identifying the size of the foot at the end of the arm extending therefrom.

13. A jeweler's mounting gauge for measuring the internal size of a stone mounting comprising: a support assembly; a series of individual arms extending in sequence from said support assembly, and a disc-like foot permanently mounted on the outer end of each said arm in a plane perpendicular to a longitudinal axis of each arm, the feet being successively larger in diameter, and further comprising selection means for selectively moving one of said arms between a retracted position and an operational extended position.

14. A mounting gauge as in claim 13 and wherein said support assembly comprises upper and lower sections, one of said sections including a plurality of longitudinal slots, spring means having at least edge portions thereof resilient, and coupling means for interconnecting said upper and lower sections with said spring means therebetween overlying said slots each of said arms comprising inner and outer notches for matingly engaging the resilient edge portions of said spring means, each of said arms being slidably received in a respective slot.

15. A mounting gauge as in claim 14 and wherein said spring means comprises a resilient inverted dish-like member, and said coupling means comprises fastening means connecting said dish-like member and at least the other of said sections.

* * * * *